US010844537B2

(12) United States Patent
Venier

(10) Patent No.: US 10,844,537 B2
(45) Date of Patent: Nov. 24, 2020

(54) METHOD TO PRODUCE A DYE FOR FABRICS STARTING FROM TEXTILE WASTE MATERIAL, METHOD TO DYE FABRICS

(71) Applicant: Andrea Venier, Biella (IT)

(72) Inventor: Andrea Venier, Biella (IT)

( * ) Notice: Subject to any disclaimer, the term of this patent is extended or adjusted under 35 U.S.C. 154(b) by 31 days.

(21) Appl. No.: 15/771,911

(22) PCT Filed: Oct. 28, 2016

(86) PCT No.: PCT/IB2016/056514
§ 371 (c)(1),
(2) Date: Apr. 27, 2018

(87) PCT Pub. No.: WO2017/072718
PCT Pub. Date: May 4, 2017

(65) Prior Publication Data
US 2018/0305862 A1  Oct. 25, 2018

(30) Foreign Application Priority Data

Oct. 29, 2015 (IT) .......................... 102015000067060

(51) Int. Cl.
*D06P 1/00* (2006.01)
*C09B 67/00* (2006.01)
*C08L 1/02* (2006.01)
*C08L 29/04* (2006.01)
*C09B 67/42* (2006.01)
*C09B 67/02* (2006.01)

(52) U.S. Cl.
CPC ........ *D06P 1/0016* (2013.01); *C09B 67/0095* (2013.01); *C09B 67/0097* (2013.01); *D06P 1/0008* (2013.01); *C08L 1/02* (2013.01); *C08L 29/04* (2013.01); *C08L 2203/12* (2013.01)

(58) Field of Classification Search
CPC .. D06P 1/0016; D06P 1/0008; C09B 67/0095; C09B 67/0097; C08L 1/02; C08L 29/04; C08L 2203/12
See application file for complete search history.

(56) References Cited

U.S. PATENT DOCUMENTS

| 3,184,332 | A | * | 5/1965 | Rachinsky | ............ D06M 15/55 442/148 |
| 5,255,350 | A | * | 10/1993 | Hermann | ............ B01F 13/1055 358/1.9 |
| 5,609,676 | A | * | 3/1997 | von der Eltz | ............ C08B 9/00 106/166.01 |
| 5,902,356 | A | | 5/1999 | Buehler | |
| 2003/0230824 | A1 | | 12/2003 | Furgiuele et al. | |
| 2011/0236945 | A1 | * | 9/2011 | Barbier | ..................... C12P 7/10 435/165 |

FOREIGN PATENT DOCUMENTS

| CN | 104816396 | * | 8/2015 | |
| EP | 1 004 416 A1 | | 5/2000 | |
| EP | 1004416 | | 5/2000 | |
| EP | 1693504 | * | 8/2006 | ............... D06P 1/34 |
| JP | 2007-308816 A | | 11/2007 | |
| JP | 2007308816 | | 11/2007 | |
| WO | 2009028878 | | 5/2009 | |
| WO | 2011077446 | | 6/2011 | |

OTHER PUBLICATIONS

Towards Recycling of Textile Fibers, Anna Peterson, Department of Chemistry and Chemical Engineering, Chalmers University of Technology, Gothenburg, Sweden, 2015, 75 pages.
Search Report Received in Italian priority application dated Jul. 18, 2016, 11 pages.
Int'l Search Report and Written Opinion from Int'l Appl'n. No. PCT/IB2016/056514, dated Apr. 3, 2017.
Anna Peterson: "Towards Recycling of Textile Fibers: Separation and Characterization of Textile Fibers and Blends Master's thesis in Materials Chemistry and Nanotechnology", Chalmers University of Technology, Gothenburg, Sweden, Jan. 1, 2015 (Jan. 1, 2015). Retrieved from the Internet: URL: http://publications.lib.chalmers.se/records/fulltext/218483/218483.pdf.
Swarna Natarajan et al.: "Surface modification of polyester fabric using polyvinyl alcohol in alkaline medium", Indian Journal of Fibre & Textile Research, vol. 37, pp. 287-291, Sep. 1, 2012 (Sep. 1, 2012). Retrieved from the Internet: URL: http://nopr.niscair.res.in/bitstream/123456789/14700/1/IJFTR 37(3) 287-291.pdf.

* cited by examiner

*Primary Examiner* — Amina S Khan
(74) *Attorney, Agent, or Firm* — Merchant & Gould P.C.

(57) ABSTRACT

A method to produce a dye, which is suited to be applied on fabrics, starts from textile waste material. The method includes an initial step, during which textile waste material is provided, which includes textile fibers, which were previously dyed. In a pulverization step, the textile fibers are pulverized to obtain the dye.

11 Claims, 3 Drawing Sheets

METHOD TO PRODUCE A DYE FOR FABRICS STARTING FROM TEXTILE WASTE MATERIAL, METHOD TO DYE FABRICS

This application is a National Stage Application of International Application No. PCT/IB2016/056514, filed 28 Oct. 2016, which claims benefit of Ser. No. 102015000067060, filed 29 Oct. 2015 in Italy and which applications are incorporated herein by reference. To the extent appropriate, a claim of priority is made to each of the above-disclosed applications.

TECHNICAL FIELD

The invention relates to a method to produce a dye suited to be applied on fabrics, and to a method to dye fabrics.

TECHNOLOGICAL BACKGROUND

In the field of fabric dyes, synthetic or natural dyes are produced in a known manner. Synthetic dyes are more used on an industrial level, as they ensure greater stability. As a matter of fact, natural dyes, which are mainly obtained from plants, can create problems concerning their capability of reproducing colours, their stability and the fact that their production process requires different pH and temperature intervals.

The processes used to produce known dyes, in particular synthetic dyes, suffer from some drawbacks.

One drawback is due to the fact that these processes, as they use chemical synthesis, generate pollution during the production, thus damaging the environment.

On the other hand, when dealing with the production of natural dyes, you need to take into account the availability of raw materials and the consequent alteration of the ecosystem deriving from the exploitation of said raw materials.

SUMMARY OF THE INVENTION

An object of the invention is to provide a method to produce a dye for fabrics starting from textile waste material and method to dye fabrics, which are able to solve this and other drawbacks of the prior art and which, at the same time, can be carried out in a simple and economic fashion.

In particular, one of the advantages of the invention lies in the possibility of recycling textile materials, which were previously subjected to dyeing processes, to produce a dye, which can be used to dye fabrics.

A further advantage lies in the reduced emission of polluting substances. This aspect turns out to be especially advantageous in the light of laws that are becoming more and more restrictive in terms of ecology and eco-sustainability.

According to the invention, this and other objects are reached by methods having the features set forth herein.

BRIEF DESCRIPTION OF THE DRAWINGS

Further features and advantages of the invention will be best understood upon perusal of the following detailed description, which is provided by way of example and is not limiting, with reference, in particular, to the accompanying drawings, wherein.

DETAILED DESCRIPTION OF THE INVENTION

Figure 1:
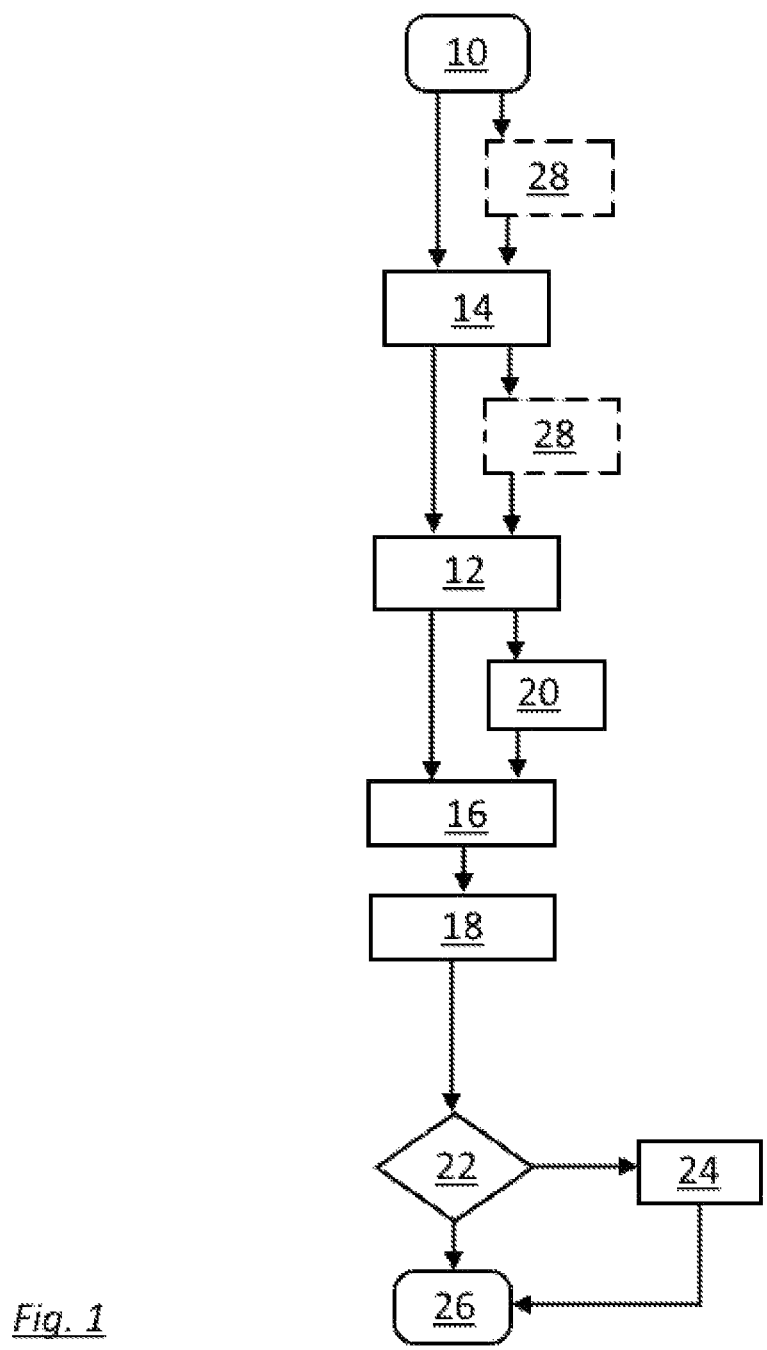
FIG. 1 is a flowchart relating to a process for the production of a dye according to a variant of the invention.

The method to produce a dye, which is suited to be applied on fabrics, starting from textile waste material, comprises the following steps:

an initial step 10, during which textile waste material is provided, which comprises textile fibers, at least part of them having been previously dyed, and a pulverization step 12, during which said textile fibers are pulverized to obtain the dye.

Said textile fibers derive from textile materials, such as, by mere way of example: cloths, rejects of textile material, fabrics, clothings, etc. The textile material can derive, from example, from textile production rejects or from items of clothings that are no longer used by people. By so doing, said textile material can be recycled to produce the dye. The dye is in powder form and is suited to be used to dye further textile materials.

The textile fibers to be pulverized preferably are natural fibers, such as for example fibers of animal or plant origin. Preferably, the textile fibers are selected among cellulose fibers, protein fibers, or mixtures thereof. A preferred variant of the invention involves the use of cotton, but it is also possible to use wool, linen, silk, and other natural fibers, or a combination thereof. Alternatively, it is possible to use synthetic fibers or a mixture of synthetic and natural fibers. For example, you can use polyester, acrylic fibers, polyamide, teflon, polyurethane and mixtures thereof with cotton, silk, viscose, linen, wool. The textile fibers to be pulverized can conveniently be artificial fibers, such as for example cuprammonium rayon, viscose, acetate.

The textile fibers to be pulverized are preferably chosen among natural or artificial fibers or mixtures thereof. Natural or artificial textile fibers can be mixed with synthetic fibers. Conveniently, the synthetic fibers do not exceed 20%, preferably 10%, by weight of the textile fibers to be used in the pulverization step 12. Therefore, the natural or artificial fibers are at least equal to 80%, preferably 90%, by weight of the textile fibers to be used in the pulverization step 12.

Preferably, at least part of the textile fibers were previously dyed, which means that at least one dyeing substance was intentionally applied on them in order to change their initial colour.

Preferably, at least part of the textile fibers were previously dyed with a synthetic dye. More preferably, all the fibers of textile material were previously dyed with a synthetic dye. Alternatively, at least part of the textile fibers were previously dyed with a natural dye. If necessary, part of the textile fibers were previously dyed with a natural dye and another part of the textile fibers were previously dyed with a synthetic dye.

By way of example, the textile fibers can be available in the form of one or more rags of fabric, one or more textile articles (e.g. clothings), one or more threads, one or more yarns, single fibers, etc. Therefore, for the purpose of the invention, the term "textile fiber" comprises—in a non-limiting manner—textile fibers, fabrics, cloths, items of clothing made with textile fibers, threads, yarns. Hence, during the pulverization step, operators can pulverize: textile fibers, fabrics, cloths, items of clothings made with textile fibers, threads, yarns. For example, the usable fabrics can comprise: velvet, tweed, fustian, denim, gabardine, twill, fleece, satin, canvas, cloth, tartan, piqué, knitted fabric, nonwoven fabric, needled fabric, etc.

Generally speaking, the textile material comprises a series of textile elements or textile products having different colours. For example, the textile material comprises blue patches, yellow rags, green clothes, white threads, etc.

Therefore, in these cases, the method comprises the step of dividing the textile fibers into groups based on their colour. For example, you can create a group of yellow fibers, a group of blue fibers, a group of green fibers, and so on. By mere way of example, the group of yellow fibers can comprise one or more fabric cloths, one or more textile articles (e.g. items of clothing), one or more threads, one or more yarns, etc.—as these elements are all yellow. Preferably, each group of coloured fibers is sorted out as homogeneously as possible, even though a group of fibers can comprise fibers that are different from one another in terms of shades of colour.

A textile element (such as a fabric or an item of clothing) can comprise a plurality of colours; for example a sweater that is mainly blue, but has small yellow decorations. In this case, in accordance with predetermined logics, it is possible to decide to which group of coloured fibers the textile element should be assigned, or whether said textile element should be set aside. Preferably, multi-colour items are set aside and, after that, they are pulverized in order to assess the final colour of the powder obtained from them. Subsequently, the powder is assigned to the group of coloured pulverized fibers having the most similar colour.

The colour division step is carried out based on predetermined logics.

According to a first variant of the invention, shown by way of example in FIG. 1, the method to produce the dye comprises the following operating steps:

a division step 14, during which the fibers are divided into groups based on their colour; said pulverization step 12 comprising the step of separately pulverizing each group of fibers, so as to obtain powders of different colours starting from each group;

a powder selection step 16, during which the powders of different colours are selected.

Preferably, after the powder selection step 16, there is provided a powder mixing step 18, during which the powders of different colours are mixed in order to give the desired colour to the dye.

The pulverization step 12 is of the mechanical type. This leads to the use of means for grinding, crushing or reducing into powder the textile fibers. This pulverization means can be per se known means, such as for example a grinder or a mill, which are conveniently housed in a grinding chamber.

From the pulverization step 12 you obtain a coloured powder dye, which is substantially produced from recycled textile material supporting the dye or pigment that had been previously applied to the textile material. Therefore, this powder is substantially different, from the structural point of view, from a synthetic dye. This difference can be also appreciated through microscope observation: the powder obtained in accordance with the invention appears as a floury material containing fragments of textile fibers. This is especially evident in case of coloured powders obtained from recycling rejects of textile material with natural or artificial fibers, in particular cellulose fibers.

The powder selection step 16 and/or the powder mixing step 18 can take place according to predetermined criteria, so as to create a final powder (i.e. the dye) having the desired colour. Hence, after having obtained the different coloured powders at the end of the pulverization step 12, in the powder selection step 16 you can choose which powders to use and decide the quantity of each powder, so as to give to the dye the desired colour in the powder mixing step 18. Conveniently, it is possible to use per se known dispensing and/or mixing devices.

According to a variant of the method, the powder mixing step 18 can be not necessary. This can be the case when the coloured powder already has the desired colour (e.g. blue) and, therefore, this powder does not need to be mixed with powders of other colours.

The method can comprise a sieving step 20, during which the pulverized material is sieved. This step is carried out using suitable machines, which allow the powder to go through sieves or screens with a predetermined size, depending on the grain size to be obtained. Preferably, the size of the grains of the powder ranges from 50 to 350 micron; more preferably from 100 to 250 micron; more preferably from 100 to 150 micron, for example approximately from 120 to 125 micron.

For example, the sieving step is carried out by means of different sieves in series, generally in a cascade arrangement. For example, the first sieve allows the passage of grains measuring 350 micron, the second sieve allows the passage of grains measuring 200 micron, the third sieve allows the passage of grains measuring 125 micron.

Figure 1A:
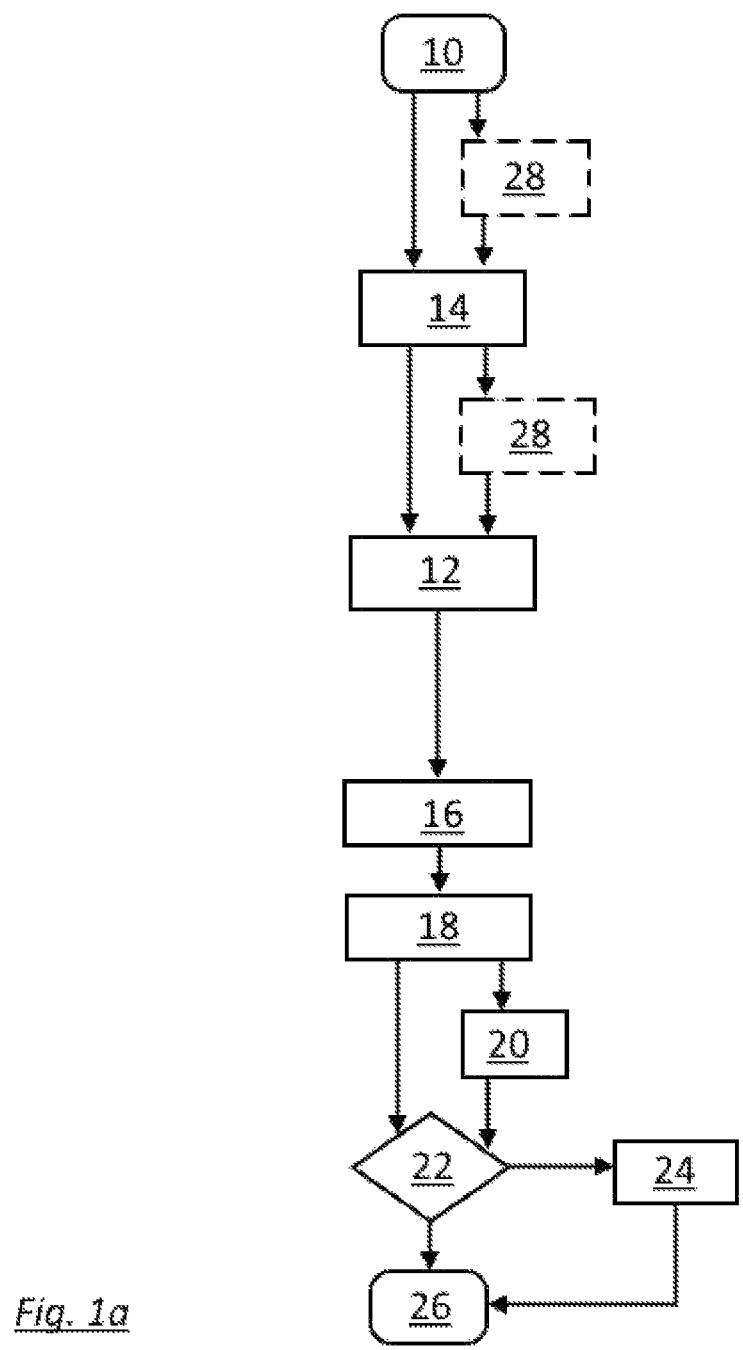
FIG. 1a is a flowchart relating to a process for the production of a dye according to a further variant of the invention.

According to an explanatory embodiment, the method comprises a sieving step 20, during which the powders with different colours, obtained after the pulverization step 12, are sieved singularly (20, FIG. 1), before being subjected to the powder mixing step 18, during which they are mixed so as to form the final powdery dye. For example: you obtain a blue powder by grinding fibers belonging to the group of blue fibers, then the blue powder is sieved; the same operation is repeated for the other coloured powders and, finally, the powders are mixed. On the other hand, according to a further alternative embodiment, the powders with different colours, obtained after the pulverization step 12, are firstly mixed and, then, the powder obtained through the powder mixing step 18 (having the desired colour) is subjected to the sieving step 20 (see FIG. 1*a*).

According to an optional variant of the invention, there is provided a comparison step 22, during which the powdery dye obtained through the pulverization step 12 (and, if necessary, subjected to the powder selection and/or mixing step 18) is compared with a reference colour, for example in a lab. If the dye does not comply with the reference colour, a correction step 24 takes place, during which said dye subjected to the comparison step 22 undergoes the addition of other coloured powders, until a dye is obtained, which has a colour that is similar to the reference colour. This control, which can be carried out in a lab, can be a visual control or it can be made with the use of known tools, such as for example spectrophotometers. On the other hand, if the comparison step 22 produces a positive result, the dye is ready (see block 26 shown in the flowchart of FIG. 1). Furthermore, you can establish a tolerance threshold between the colour assumed by the obtained powdery dye and the reference colour.

Figure 2:
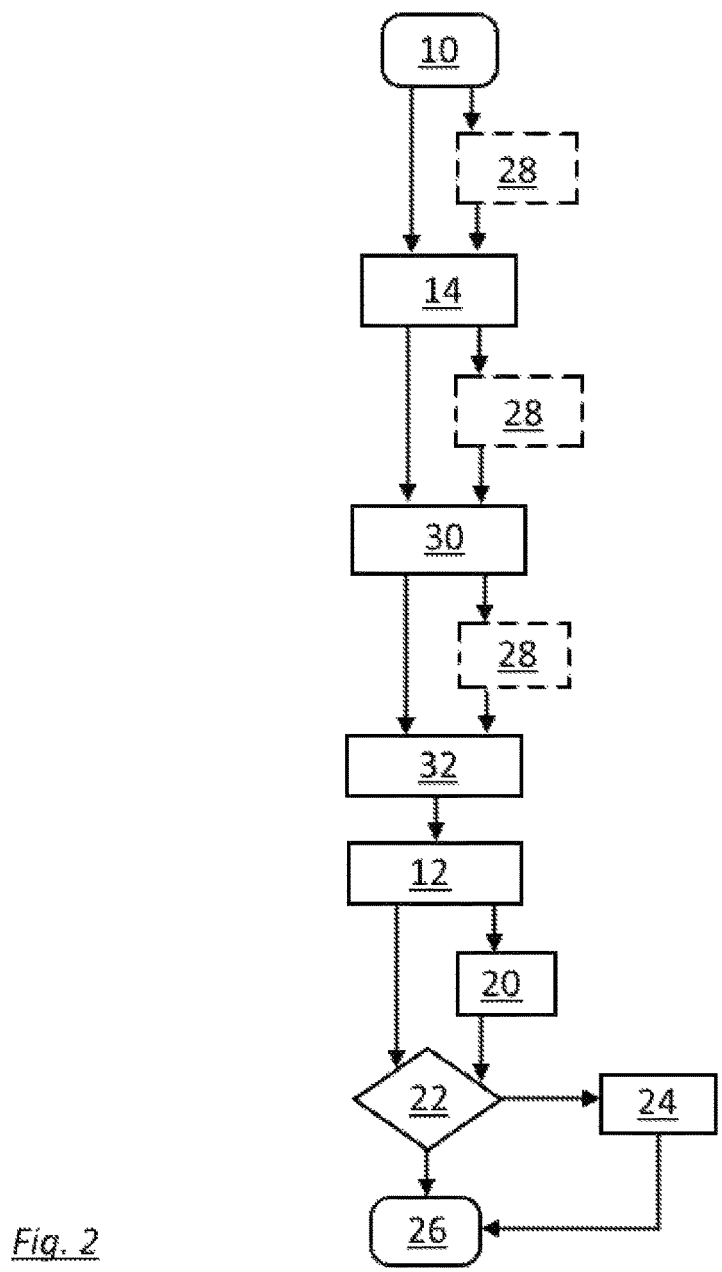
FIG. 2 is a flowchart relating to a process for the production of a dye according to a further variant of the invention.

According to a second embodiment of the invention, which is shown by way of example in FIG. 2, the dye production method, after the division step 14, comprises the following steps:

a fiber selection step 30, during which at least one preliminarily divided group of fibers is selected, said preliminarily divided group of fibers being useful to give the desired colour to the dye, and a fiber mixing step 32, during which the fibers belonging to the previously divided and selected groups are mixed according to a quantity proportion that is such as to give the desired colour to the dye.

After the fiber selection step 30 and the fiber mixing step 32, the pulverization step 12 takes place, during which the previously selected and mixed fibers are pulverized.

Therefore, after having divided the fibers into colour groups, you can identify the colours needed to create the desired dye colour, subsequently the textile fibers (or the textile elements comprising the fibers) are selected among the group of coloured fibers and their quantity is chosen so as to give to the final dye the desired colour. After that, the chosen fibers (which, therefore, comprise a plurality of fibers of different colours) are pulverized together. By so doing, the obtained powder is the final dye, as the fibers with different colours were previously selected and mixed before the pulverization step.

In this case, again, the method preferably comprises the sieving step 20, during which the pulverized material is sieved. Generally speaking, the sieving step 20 can be carried out in any instant following the pulverization step 12.

In this case, again, the method preferably comprises the dye control step 22 described above.

According to a preferred embodiment of the invention, before the pulverization step 12, there is provided an application step 28, during which a reactive substance is applied to the textile fibers. This application step 28 can take place, for example, through an impregnation operating step and, optionally, with a following drying at a predetermined temperature. In particular, this application step 28 can be indifferently applied to the embodiments shown in FIGS. 1, 1*a* and 2.

The aforesaid application step 28 has the advantage of making the following pulverization step 12 easier. The reactive substance fulfills the function of making the fibers more fragile and, hence, easier to be ground during the pulverization; by so doing, production times can be reduced and, especially, finer powders can be obtained. With particular reference to the examples described herein, the aforesaid application step 28, during which the reactive substance is applied, can be carried out in any instant prior to the pulverization step 12, as you can see in the flowcharts of FIGS. 1, 1*a* and 2. For example, the application step 28 can be carried out before the division step 14 or after the latter. In a further variant, this application step 28 can be carried out both before and after the division step 14.

For the purpose of the invention, different reactive substances can be used. In a first preferred embodiment, the reactive substance is selected among colloidal silicic acid, polyvinyl acetate, or polyvinyl alcohol.

The colloidal silicic acid is especially preferred and it can be applied to the textile fibers in the form of a water dispersion. Preferably, the colloidal silicic acid is present in the water dispersion in a concentration ranging from 0.5% to 35% by weight. Preferably, the pH of the dispersion is acid, namely smaller than 7, more preferably smaller than 6.

The polyvinyl acetate and the polyvinyl alcohol can be also applied to the textile fibers in the form of water solutions or dispersions, as a person skilled in the art knows.

The application of the aforesaid reactive substances allows you to obtain, in the pulverization step, a powder dye that is very fine and, therefore, having a greater dyeing capacity when it is used in fabric dyeing or colouring processes. As a matter of fact, experiments have shown that use of the aforesaid reactive substances, in particular of the colloidal silicic acid, allows users to obtain dyeing powders having a mean particle diameter $Dv90$ ranging from 100 to 150 micrometers. Preferably, the dyeing powders have a mean particle diameter $Dv10$ ranging from 10 to 15 micrometers. Preferably, the dyeing powders have a mean particle diameter $Dv50$ ranging from 25 to 35 micrometers. The aforesaid values $Dv10$, $Dv50$ and $Dv90$ are measured with the laser diffraction technique in accordance with the method ISO 13320:2009.

According to a preferred embodiment, the application step 28 comprises the step of causing the textile fibers to come into contact with a bath comprising a water solution or dispersion of the reactive substance.

Preferably, between the application step 28 and the pulverization step 12 there is provided a drying step, during which the textile fibers are dried. A particular variant of the drying step comprises a removal step, for example through wringing or centrifugation, during which part of the liquid reactive substance is mechanically removed from the textile fibers. Subsequently, a drying step takes place, preferably between 60 and 90° C., during which the textile fibers are heated so as to remove a further quantity of reactive substance. Then, preferably, a heating step is carried out, during which the textile fibers are heated at a temperature greater than the one of the drying step, preferably between 120 and 170° C., preferably for an amount of time ranging from 2 to 30 minutes. The heating step is useful to make the fibers more fragile, so as to obtain finer fibers with the pulverization step 12. Preferably, at the end of the drying step, the residual quantity of reactive substance (or "pick-up") remaining in the textile fibers is smaller that 25% or 20%, usually 1%-20%, by weight relative to the weight of the textile fiber initially subjected to the application step 28. This residual percentage or pick-up is calculated as: (weight of the wet material−weight of the dry material)/(weight of the dry material)*100. According to a possible alternative variant, the drying step can take place naturally, namely leaving the fibers in contact with air.

By way of example, starting from 1 Kg of textile material, in particular cotton, you can obtain approximately 900-990 g of dyeing powder. Therefore, the method according to the invention advantageously has a high efficiency.

The subject-matter of the invention also comprises a dye produced with the dye production method according to the invention.

Figure 3:
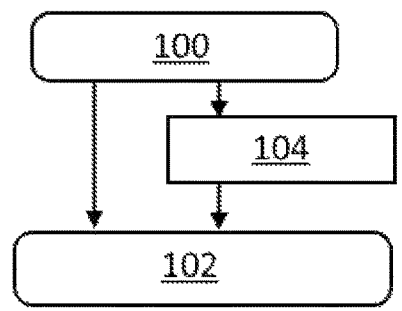
FIG. 3 is a flowchart relating to a process for dyeing a fabric according to a variant of the invention.

According to the invention and with particular reference to FIG. 3, there is provided a method to dye fabric comprising the following steps:

a preparation step 100, during which a dye is provided, which is manufactured in accordance with any one of the embodiments and variants of the invention, a dye application step 102, during which said dye is applied to a fabric.

The dye can be applied to different types of fabric, among which there are natural fabrics, synthetic fabrics or mixed fabrics. The dye can be applied on rough and smooth fabrics, with different weaves. For example, there are weaves with a simple interlacing to form flat and smooth fabrics. Or there are weaves made by interlacing different threads to form textured fabrics, with elaborate or figured surfaces, with patterns that can be more or less in relief. The fabric to be dyed preferably comprises natural or artificial fibers or mixtures thereof. Natural or artificial textile fibers can be mixed with synthetic fibers. Natural fibers usually have a plant or animal origin. Preferably, the textile fibers of the fabric to be dyed are selected among cellulose fibers, protein fibers, or mixtures thereof. Conveniently, the synthetic fibers do not exceed 20%, preferably 10%, by weight of the textile fibers to be dyed.

Hereinafter you can find a description of some processes that can be preferably used in the dye application step 102.

Printing—The application with textile printing can be carried out with conventional machines for the screen printing of items of clothing or for the printing of fabrics. These machines can be rotary printing machines or flat bed printing machines. To ensure acceptable solidities, an assisting product can be used. This assisting product basically is a water-based chemical preparation with polyamide resins and/or polyurethane resins and/or acrylic resins, with the addition of stabilizers, additives and, if necessary, synthetic or natural thickening agents. Just like a conventional application, the printing paste is prepared by mixing the dye powders according to the invention with the assisting product. After that, you print, dry and, if necessary, polymerize.

Coating—The application through textile coating can be carried out with conventional fabric coating machines, for example blade or cylinder machines. To ensure acceptable solidities, the assisting product can be used. Just like a conventional application, the coating paste is prepared by mixing the dye powders with the assisting product. After that, you print, dry and, if necessary, polymerize or thermo-fix.

Spraying—The application through spraying is preferably carried out with airbrushes. To ensure acceptable solidities, the assisting product can be used. Just like a conventional application, the liquid product is prepared by mixing the dye powders with the assisting product. After that, you spray, dry and, if necessary, polymerize.

Immersion—The application through immersion can be carried out using conventional system used for fabrics or items of clothing, generally consisting in tanks with still or moving bath. To ensure acceptable solidities, an assisting product can be used. Just like a conventional application, the solution is prepared by mixing the dye powders with the assisting product. After that, the textile articles are immersed in the tank. Then you centrifugate, dry and, if necessary, polymerize.

Exhaust dyeing—The application through exhaust dyeing can take place in conventional exhaust dyeing machines for dyeing fabrics or items of clothing. These machines can be, for example, kier dyeing machine, air flow dyeing machines, beater dyeing machines, jigger dyeing machines or jet dyeing machines. Before or during the dyeing process, the textile article can be treated with the assisting product, so as to increase its efficiency. The dying bath is prepared, introducing the powder dye according to the invention. Then the dyeing process takes place (preferably between 20 and 90° C.). To increase the efficiency, the pH can be set at predetermined values. After that, you can rinse and, if required, go on with the finishing.

Impregnation—The application through impregnation can take place in conventional foulard-type (or pad-type) machines. Before or during the dyeing process, the textile article is treated with the assisting product. The dying bath is prepared, introducing the powder dyes. Then impregnation, squeezing and thermo-fixing take place. After that, you can rinse and, if required, go on with the finishing.

Brush, sponge or cloth.—These applications can be carried out manually by mixing the assisting product with the dye powders according to the invention. Then you dry and polymerize.

Water-free dyeing—This application can be carried out in conventional vessel machines for items of clothing or in machines with unperforated vessels (drum-type). To ensure acceptable solidities, the assisting product can be used. Just like a conventional application, the gel is prepared by mixing the dye powders with the assisting product. After that, you can start with the application on the textile articles contained in the vessel, introducing the gel and the textile articles. Alternatively, the assisting product can be applied on the textile article beforehand and, subsequently, the dye powders are applied. Then you dry and, if necessary, polymerize. After that, you can rinse and, if required, go on with the finishing.

When the dye is applied by means one process among printing, coating, water-free dyeing, spraying and immersion, the assisting product preferably includes solvents and solutes mixed with additives.

A solvent suited to be used in the assisting product could be water.

In particular, according to a first embodiment, the assisting product includes at least one dispersion of one or more acrylic polymers. These acrylic polymers can be, for example, free from nonylphenol ethoxylate and preferably free from free formaldehyde. Furthermore, these acrylic polymers preferably are thermally crosslinkable or, more preferably, self-crosslinkable.

As an alternative or in addition to the aforesaid acrylic polymers, the assisting product can include a dispersion of polyurethane, preferably free from free isocyanate.

As an alternative or in addition to the aforesaid acrylic polymers or to the aforesaid dispersion of polyurethane, the assisting product can include a dispersion of polyamide.

When the dye is applied by means of exhaust dyeing or impregnation, the assisting product preferably includes a water solution of cationic polymers.

The aforesaid water solution can contain polyethylene and polyamide, if necessary with amino-functional silicone. Optionally, this solution is mixed with dispersions of acrylic polymers or polyurethane polymers, preferably cationic ones.

Conveniently, the fabrics are subjected to a treatment step 104 before the dye application step 102, so as to improve the efficiency of the application steps described above. The application can take place in the same machines, prior to or during the dyeing step.

The treatment step 104 can be carried out with different techniques. For example, for applications by means of printing, spraying, water-free dyeing, immersion, coating, the assisting product is previously applied to the fabric and then, if necessary, a drying process is carried out; subsequently, the dye is applied.

In case of dyeing, the assisting product is preferably applied in a separate bath (with a predetermined time and a predetermined temperature, preferably between 20° C. and 80° C.). The drying can be carried out before the dyeing step.

In case of exhaust dyeing, the assisting product and the dye are given time to spread in the fibers of the fabric during the absorption. The fabric is caused to come into contact with the volume of the above-mentioned bath. In an explanatory embodiment, the exhaust dyeing process is discontinuous. Usually, a predetermined percentage of assisting product is applied based on the weight of the goods to be dyed (i.e. the fabric to be dyed). This process usually takes place with moving goods and/or baths.

In case of dyeing by means of impregnation, the assisting product is applied in predetermined quantities, preparing a bath prior to the one of the dye. For example, the assisting product is squeezed or wrung together with the fibers through proper apparatuses, for example cylinders. The absorption generally involves a restricted, confined and concentrated bath volume. The process is continuous or semi-continuous. The assisting product is usually applied at a predetermined temperature, adjusting the absorption (with a predetermined squeezing ratio).

The subject-matter of the invention also comprises a dyed fabric produced with the dyeing method according to the invention.

Furthermore, the subject-matter of the invention comprises the use of a powder dye, obtained through pulverization of textile waste material, to dye a fabric. Preferably, the powder dye is obtained by means of the method described above.

Naturally, the principle of the invention being set forth, embodiments and implementation details can be widely changed relative to what described above and shown in the drawings as a mere way of non-limiting example.

The invention claimed is:

1. A method to produce a dye, which is suited to be applied on fabrics, starting from textile waste material, said method comprising the following steps:
   an initial step, during which textile waste material is provided, which comprises textile fibers which were previously dyed, wherein the textile fibers are selected from: natural fibers of animal or plant origin, artificial fibers, or mixtures thereof;
   an application step comprising applying a reactive substance to the textile fibers to make the textile fibers more fragile, wherein the reactive substance comprises colloidal silicic acid; and
   a pulverization step after the application step, during which said textile fibers are pulverized to obtain the dye which is a powder.

2. The method according to claim 1, wherein the natural fibers are selected among: cellulose fibers, protein fibers, or mixtures thereof.

3. The method according to claim 1, wherein the application step comprises the step of bringing the textile fibers into contact with a bath comprising a water solution or dispersion of the reactive substance.

4. The method according to claim 3, further comprising a drying step between the application step and the pulverization step, during which the textile fibers are dried.

5. The method according to claim 1, further comprising the following steps:
   a division step, during which the fibers are divided into groups based on their color; said pulverization step comprising the step of separately pulverizing each group of fibers, so as to obtain powders of different colors starting from each group;
   a powder selection step, during which the powders of different colors are selected.

6. The method according to claim 5, further comprising after the powder selection step a powder mixing step, during which the powders of different colors are mixed in order to give a desired color to the dye.

7. The method according to claim 1, further comprising after the division step, the following steps:
   a fiber selection step, during which at least one preliminarily divided group of fibers is selected, said preliminarily divided group of fibers providing a desired color to the dye, and
   a fiber mixing step, during which the fibers belonging to the previously divided and selected groups are mixed according to a quantity proportion providing the desired color to the dye;
   after said fiber selection step and said fiber mixing step, said pulverization step takes place, during which the previously selected and mixed fibers are pulverized.

8. The method according to claim 1, comprising a sieving step, during which the pulverized material is sieved.

9. The method according to claim 1, wherein at least part of the textile fibers were previously dyed with a synthetic dye.

10. The method according to claim 1, further comprising a comparison step, during which the powdery dye obtained through said pulverization step is compared with a reference color; if the dye does not comply with the reference color, a correction step takes place, during which other colored powders are added to said dye subjected to the comparison step, until a dye is obtained, which has a color similar to the reference color.

11. The method according to claim 1, wherein the powder has a mean particle diameter Dv90 ranging from 100-150 micrometers, in accordance with the method ISO standard 13320:2009.

* * * * *